US011491062B2

(12) United States Patent
Heneveld, Jr. et al.

(10) Patent No.: US 11,491,062 B2
(45) Date of Patent: Nov. 8, 2022

(54) PATIENT HANDLING APPARATUS WITH LOAD SENSOR

(71) Applicant: Stryker Corporation, Kalamazoo, MI (US)

(72) Inventors: William Ross Heneveld, Jr., Portage, MI (US); Thomas Alan Puvogel, Kalamazoo, MI (US); Chad Conway Souke, Vicksburg, MI (US)

(73) Assignee: Stryker Corporation, Kalamazoo, MI (US)

( * ) Notice: Subject to any disclaimer, the term of this patent is extended or adjusted under 35 U.S.C. 154(b) by 391 days.

(21) Appl. No.: 16/850,437

(22) Filed: Apr. 16, 2020

(65) Prior Publication Data

US 2020/0330299 A1    Oct. 22, 2020

Related U.S. Application Data

(60) Provisional application No. 62/835,771, filed on Apr. 18, 2019.

(51) Int. Cl.
| | |
|---|---|
| *A61G 7/012* | (2006.01) |
| *A61G 5/08* | (2006.01) |
| *A61G 5/10* | (2006.01) |
| *G01B 7/16* | (2006.01) |
| *A61G 1/013* | (2006.01) |
| *A61G 1/017* | (2006.01) |
| *A61G 13/06* | (2006.01) |

(52) U.S. Cl.
CPC ............. *A61G 7/012* (2013.01); *A61G 1/013* (2013.01); *A61G 1/017* (2013.01); *A61G 5/08* (2013.01); *A61G 5/104* (2013.01); *A61G 13/06* (2013.01); *G01B 7/16* (2013.01); *G01B 7/18* (2013.01); *A61G 2203/32* (2013.01)

(58) Field of Classification Search
CPC ........ A61G 7/012; A61G 1/013; A61G 1/017; A61G 5/08; A61G 5/104; A61G 13/06; G01B 7/18; G01B 7/16; G01G 19/445; G01G 19/44; G01G 19/021; G01G 19/02
USPC ........ 5/611, 600, 11, 625, 627, 81.1 R, 86.1; 177/144
See application file for complete search history.

(56) References Cited

U.S. PATENT DOCUMENTS

| | | | |
|---|---|---|---|
| 4,483,404 | A | 11/1984 | Weihs |
| 4,540,057 | A | 9/1985 | Freeman |
| 4,549,622 | A | 10/1985 | Leiman |
| 4,560,017 | A | 12/1985 | Hood |

(Continued)

FOREIGN PATENT DOCUMENTS

| | | | | |
|---|---|---|---|---|
| CA | 3042732 A1 | * | 5/2018 | ............. A61B 34/30 |
| EP | 0361518 A2 | | 4/1990 | |

(Continued)

*Primary Examiner* — Robert G Santos
(74) *Attorney, Agent, or Firm* — Warner Norcross + Judd LLP

(57) ABSTRACT

A strain gauge assembly includes a member and a strain gauge supported by the member spaced. The strain gauge further includes a bearing surface and a contact surface spaced from the bearing surface. When the member is subject to a predetermined bending force, the bearing surface contacts the contact surface wherein at least a portion of the bending force bypasses the strain gauge and instead is transferred from the bearing surface to the contact surface.

20 Claims, 11 Drawing Sheets

(56) References Cited

U.S. PATENT DOCUMENTS

| | | |
|---|---|---|
| 4,581,948 A | 4/1986 | Reichow |
| 4,593,778 A | 6/1986 | Konishi et al. |
| 4,815,547 A | 3/1989 | Dillon et al. |
| 4,932,253 A | 6/1990 | McCoy |
| 4,974,692 A | 12/1990 | Carruth et al. |
| 5,823,278 A | 10/1998 | Geringer |
| 5,859,390 A | 1/1999 | Stafford et al. |
| 6,784,797 B2 | 8/2004 | Smith et al. |
| 6,924,441 B1 | 8/2005 | Mobley et al. |
| 7,454,987 B2 * | 11/2008 | Reger .................. A61B 6/547 |
| | | 5/601 |
| 10,660,814 B2 * | 5/2020 | Soundararajan ....... A61G 13/06 |
| 2006/0193443 A1 * | 8/2006 | Reger .................. A61B 5/055 |
| | | 378/207 |
| 2010/0094139 A1 * | 4/2010 | Brauers ............... A61B 5/6887 |
| | | 600/595 |
| 2018/0147104 A1 * | 5/2018 | Timm .................. A61G 13/04 |
| 2018/0147105 A1 * | 5/2018 | Timm .................. A61G 13/04 |
| 2018/0147106 A1 * | 5/2018 | Soundararajan ....... A61B 34/70 |
| 2020/0330299 A1 * | 10/2020 | Heneveld, Jr ....... G01G 19/445 |

FOREIGN PATENT DOCUMENTS

| | | | |
|---|---|---|---|
| EP | 3744598 A1 | 11/1996 | |
| WO | WO-2018098444 A1 * | 5/2018 | ............ A61B 34/30 |

\* cited by examiner

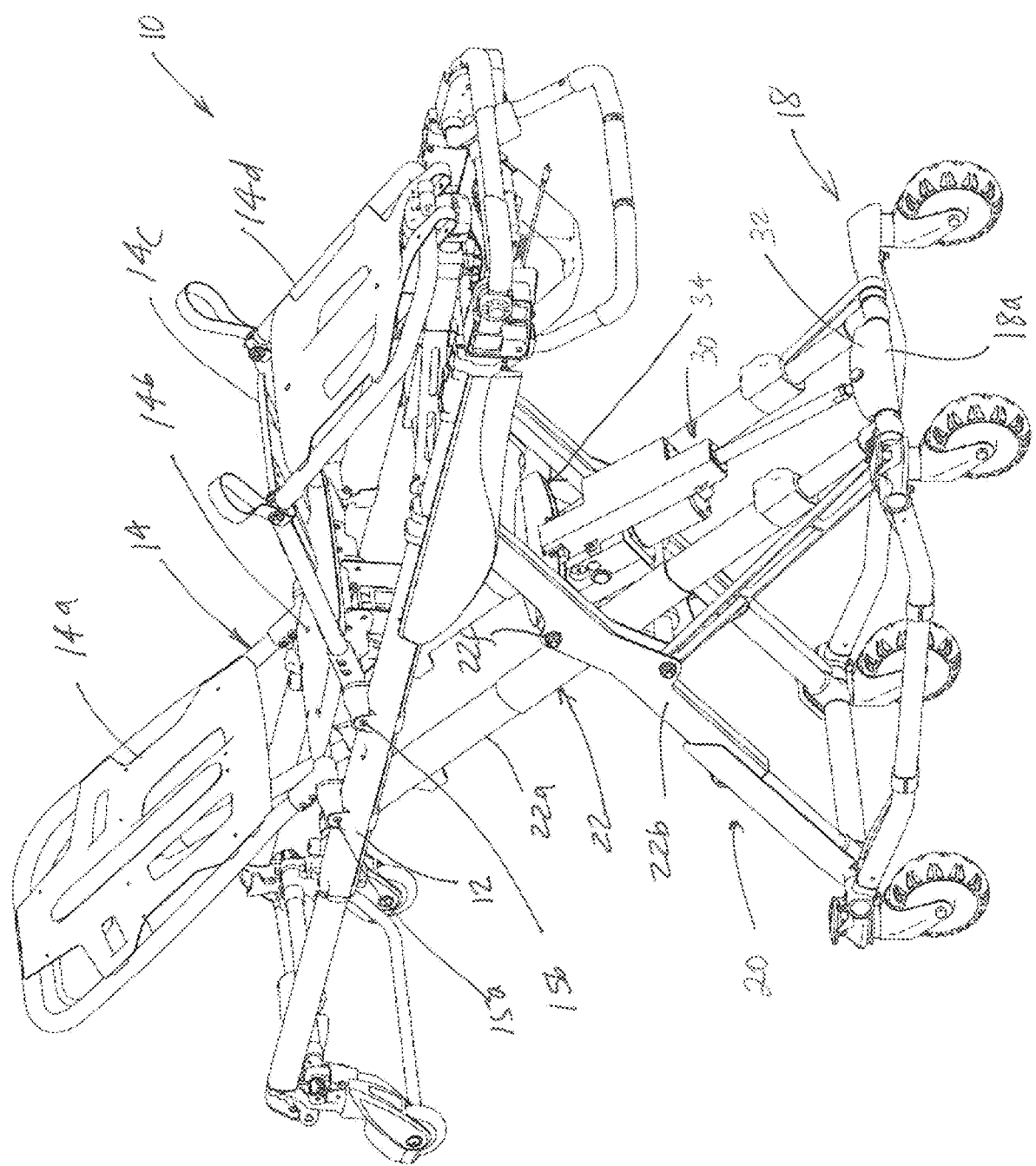

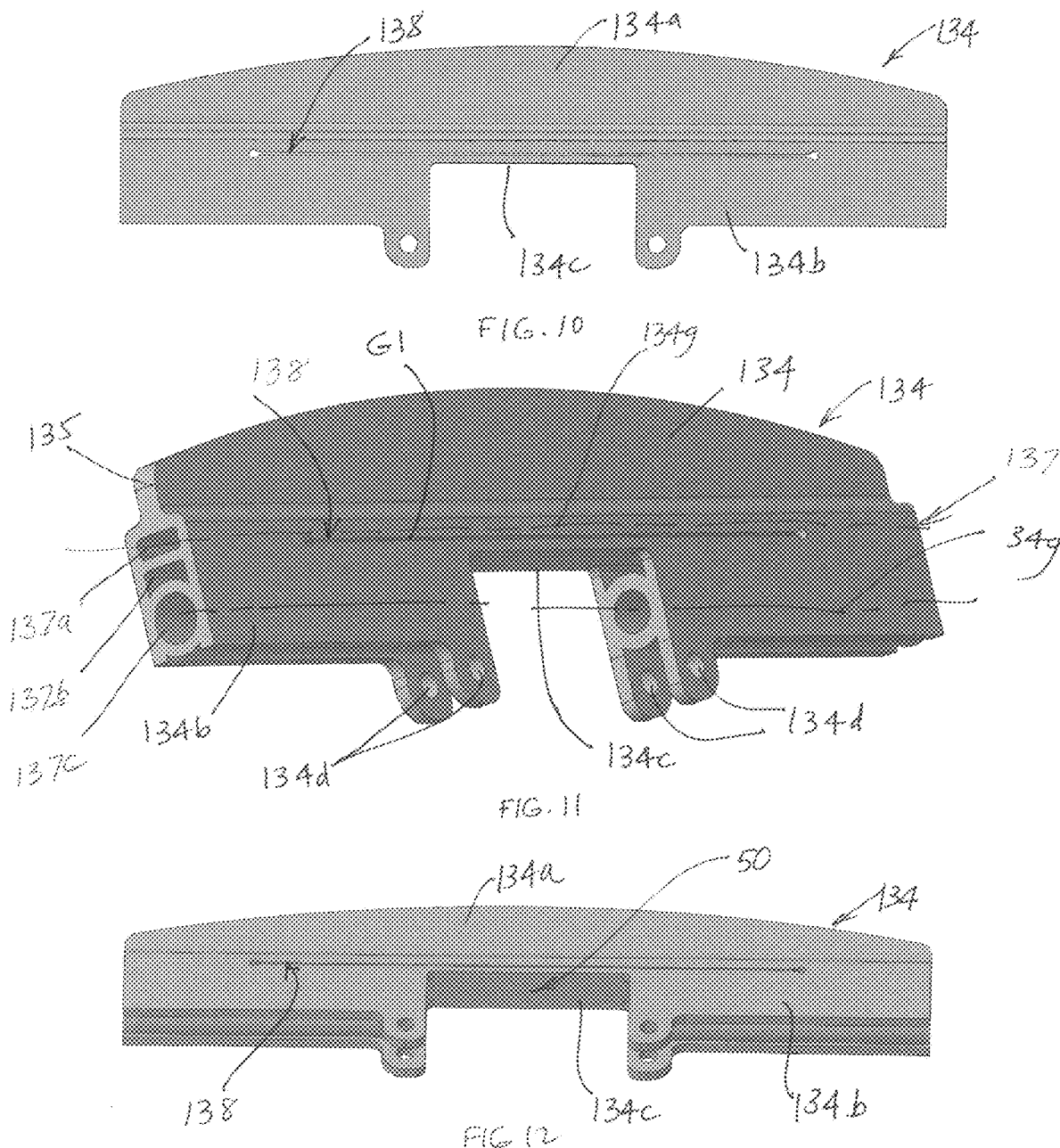

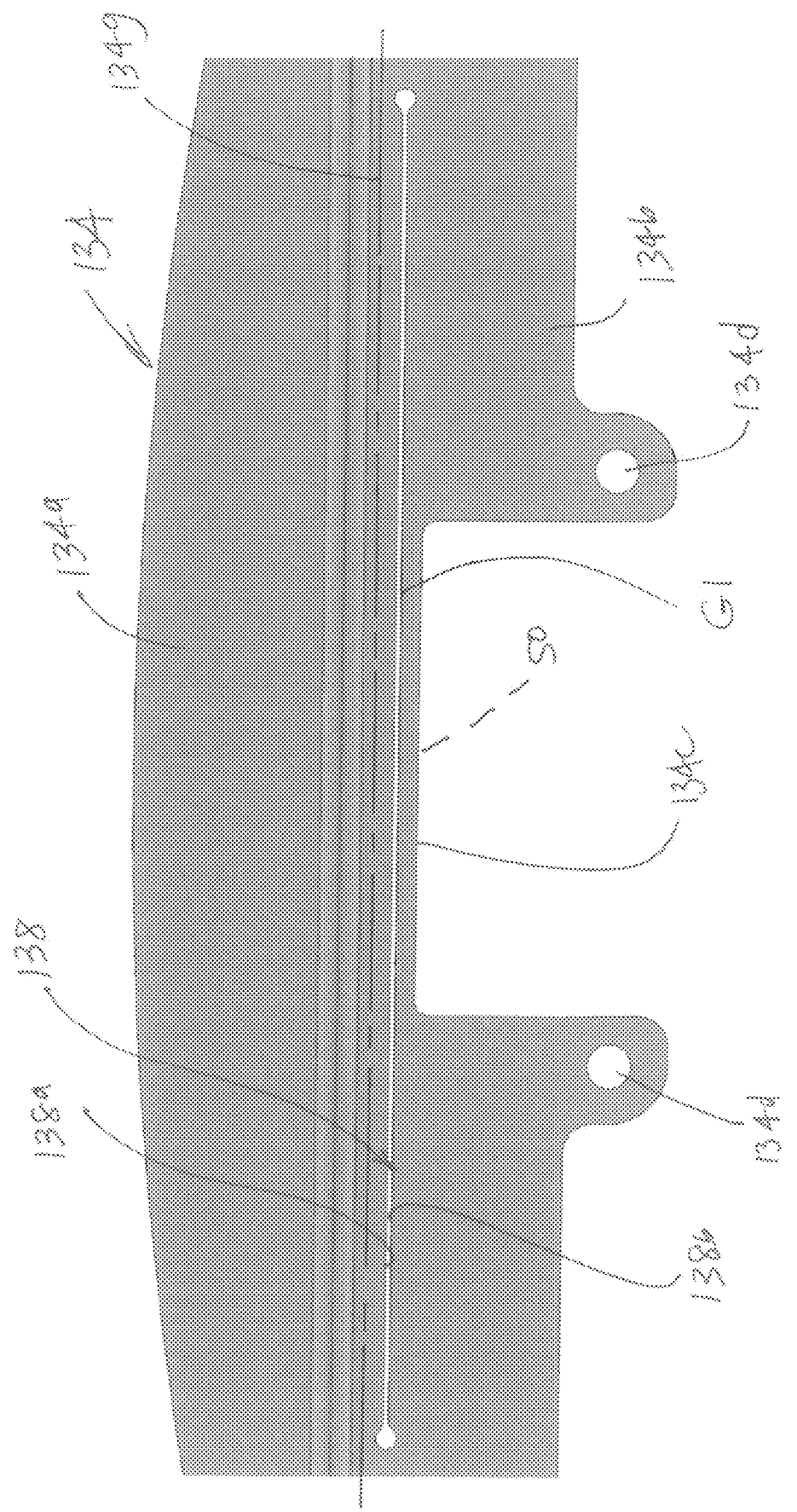

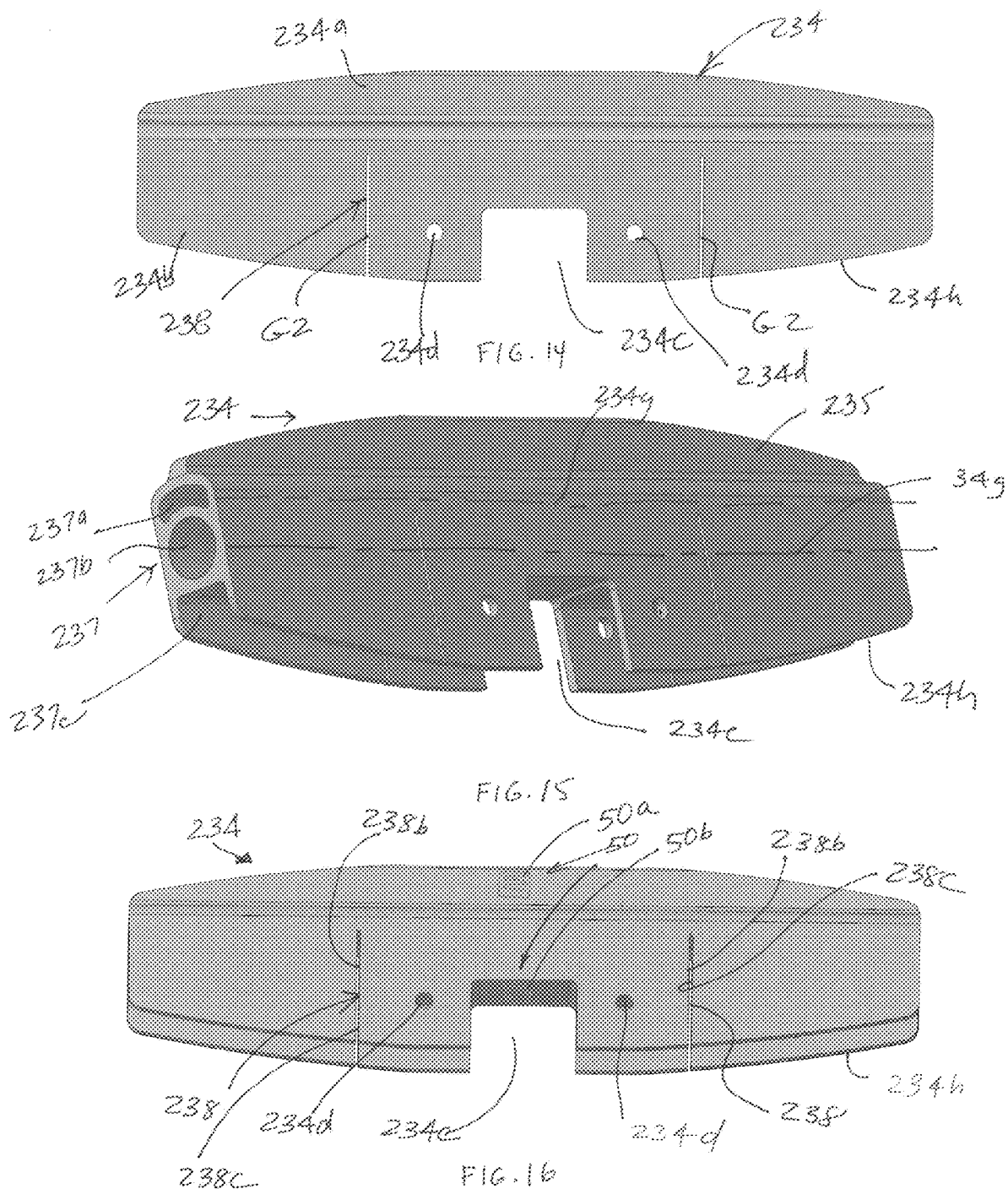

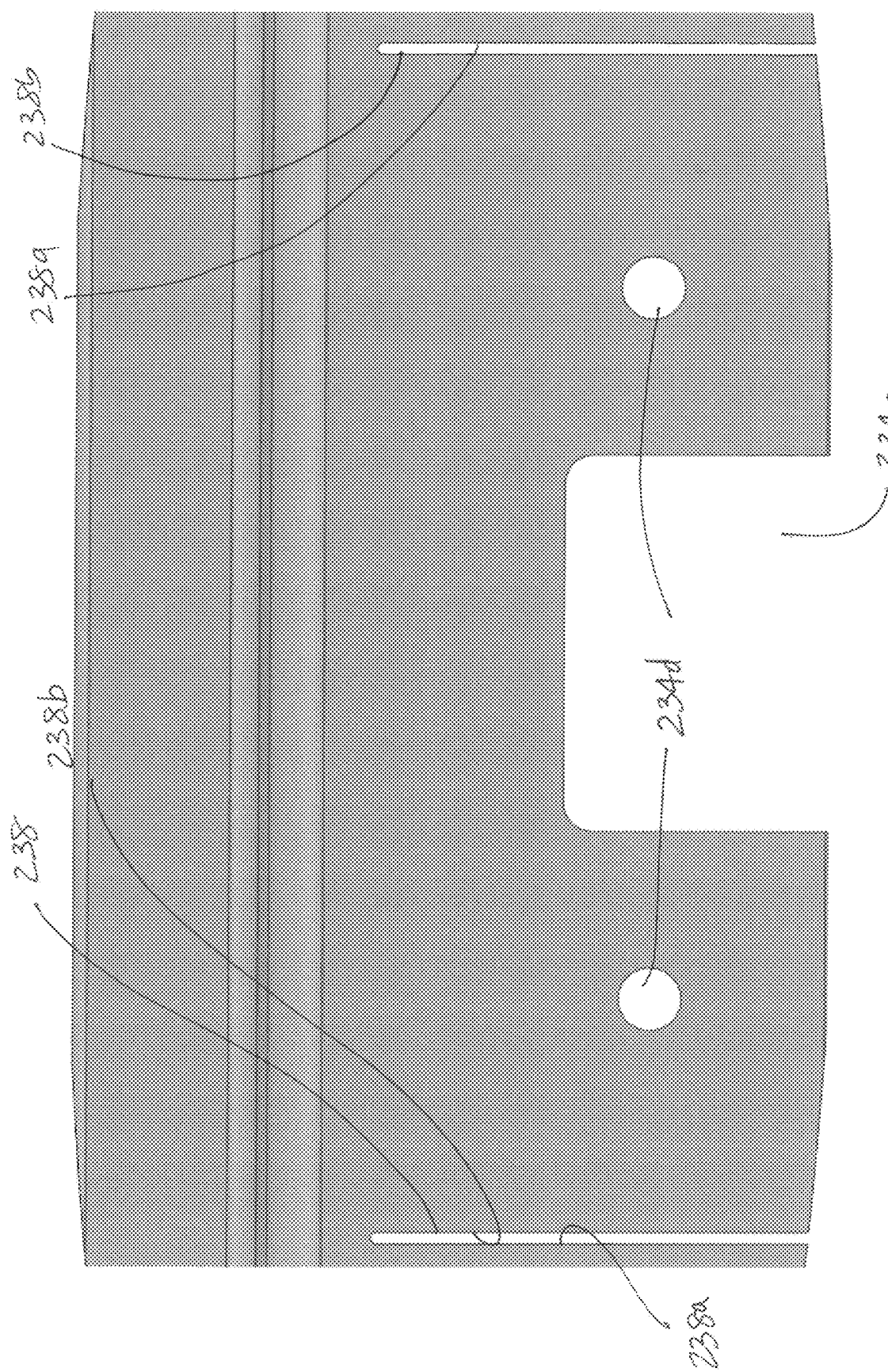

ially mounted to the lift assembly to measure the strain in the lift assembly. The strain gauge assembly includes a member that is mounted to the lift assembly and a strain gauge supported by the member. The strain gauge assembly further includes a bearing surface and a contact surface spaced from the bearing surface. When the member is subject to a predetermined bending force, the bearing surface contacts the contact surface wherein the bending force at least partially bypasses the strain gauge and, instead, is transferred from the bearing surface to the contact surface.

PATIENT HANDLING APPARATUS WITH LOAD SENSOR

This application claims the benefit of U.S. Prov. Pat. Appl. Ser. No. 62/835,771, filed Apr. 18, 2019, by inventors William Ross Heneveld, Jr. et al. and entitled PATIENT HANDLING APPARATUS WITH LOAD SENSOR, which is incorporated by reference in its entirety herein.

TECHNICAL FIELD AND BACKGROUND OF THE INVENTION

The present invention relates to a patient handling apparatus, such as emergency cot, medical bed, stretcher, stair chair, or other apparatuses that support a patient, where it is desirable to detect the presence of patient on the support surface, such as a litter.

SUMMARY OF THE INVENTION

Accordingly, a strain gauge assembly includes a member and a strain gauge supported by the member. The strain gauge assembly further includes a bearing surface and a contact surface spaced from the bearing surface. When the member is subject to a predetermined bending force, the bearing surface contacts the contact surface wherein the bending force at least partially bypasses the strain gauge and instead is transferred from the bearing surface to the contact surface.

In one aspect, the member includes a first side and a second side, both spaced from a central longitudinal axis of the member, with the strain gauge supported by the member at the first side or the second side.

In a further form, the first side is a tension side, and the second side is a compression side.

In yet a further form, the compression side includes at least one recess.

In one embodiment, the bearing surface is mounted in or adjacent the recess. Optionally, the contact surface is mounted adjacent the recess. For example, the bearing surface may be formed by a fastener that couples the member to a force generating device, such as a cylinder.

In other forms, the bearing surface comprises a first bearing surface, and the contact surface comprises a first contact surface. The strain gauge assembly further includes a second bearing surface and a second contact surface. For example, the first and second contact surfaces may be formed by a component mounted to the member. And, the bearing surfaces may be formed by fasteners that mount the component to the member.

In another form, the member comprises a bracket.

In yet another embodiment, the member includes at least one slot extending into the second side, which slot has two opposed sides. One of the sides of the slot forms the bearing surface, and another of the sides of the slot forms the contact surface.

In any of the above, the member includes a plurality of slots extending into the second side to control the location of bending when a bending force is applied along the central longitudinal axis.

Further, in any of the above, the contact surface may be parallel or angled to the central longitudinal axis. For example, the contact surface may be orthogonal to the central longitudinal axis.

According to another embodiment, a patient support apparatus includes a patient support surface, a plurality of bearings supported relative to the patient support surface, a lift assembly, which may include a reconfigurable frame, which supports the patient support surface relative to the plurality of bearings, and a strain gauge assembly mounted in the lift assembly to measure the strain in the lift assembly. The strain gauge assembly includes a member that is mounted to the lift assembly and a strain gauge supported by the member. The strain gauge assembly further includes a bearing surface and a contact surface spaced from the bearing surface. When the member is subject to a predetermined bending force, the bearing surface contacts the contact surface wherein the bending force at least partially bypasses the strain gauge and, instead, is transferred from the bearing surface to the contact surface.

In one form, the member includes a first side and a second side, both spaced from a central longitudinal axis of the member, with the strain gauge supported by the member at the first side or the second side.

In a further form, the first side comprises a tension side, and the second side comprises a compression side.

In any of the above, the compression side includes at least one recess, with the bearing surface mounted in or adjacent the recess.

In a further aspect, the contact surface is mounted in or adjacent the recess.

In any of the above, the lift assembly may comprise a reconfigurable frame, such as a pair of folding legs, and the patient support apparatus further comprises an actuator for folding and unfolding the pair of folding legs. The member forms a bracket for mounting the actuator to the pair of folding legs.

In any of the above, the bearing surface comprises a first bearing surface and the contact surface comprises a first contact surface. The strain gauge assembly further comprises a second bearing surface and a second contact surface, and the actuator being mounted to the bracket by a pair of actuator mounts, which form the first and second bearing surfaces.

In any of the above, the bracket includes a recess at the side, and the pair of actuator mounts are located at opposed sides of the recess, with the first and second contact surfaces being formed or mounted in the recess for engagement by the actuator mounts when the bracket undergoes bending.

In any of the above, the contact surface may be parallel or angled, such as orthogonal, to the central longitudinal axis adjacent.

These and other objects, advantages, purposes and features of the invention will become more apparent from the study of the following description taken in conjunction with the drawings.

BRIEF DESCRIPTION OF DRAWINGS

FIG. 1 is a perspective view of a patient handling apparatus shown with its patient support surface in a raised position;

FIG. 10 is an enlarged front view of another embodiment of the mounting bracket;

FIG. 11 is a bottom perspective view of the mounting bracket of FIG. 10;

FIG. 12 is another bottom perspective of the mounting bracket of FIG. 10;

FIG. 13 is enlarged front view of the mounting bracket of FIG. 10;

FIG. 14 is a front elevation view of a third embodiment of the mounting bracket;

FIG. 15 is a bottom perspective view of the mounting bracket of FIG. 14;

FIG. 16 is another bottom perspective view of the mounting bracket of FIG. 14; and FIG. 17 is an enlarged front view of the mounting bracket of FIG. 14.

DETAILED DESCRIPTION OF THE INVENTION

Figure 3:
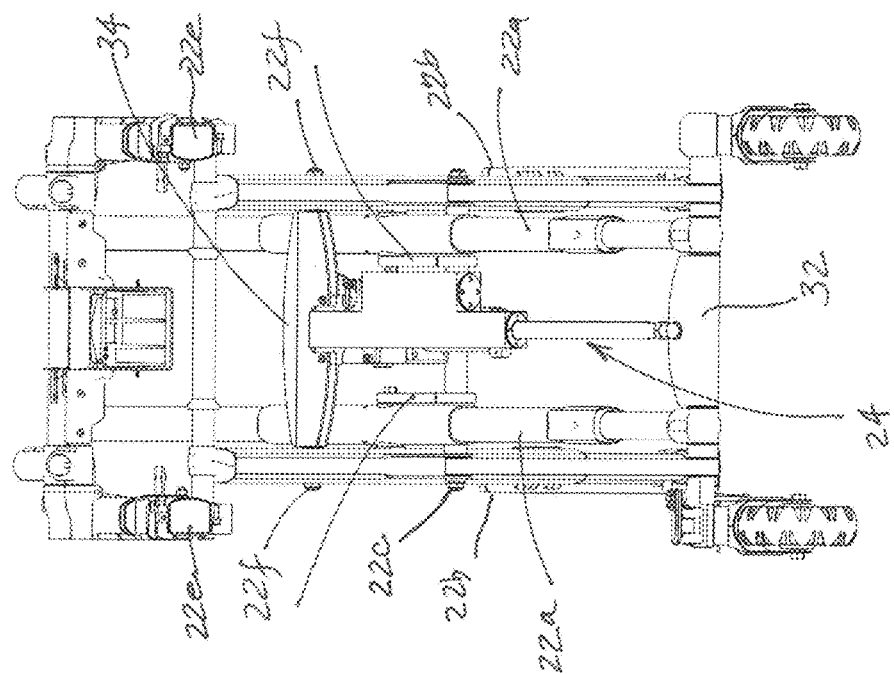
FIG. 3 is an end elevation view of the patient handling apparatus of FIG. 2.

Referring to FIG. 1, the numeral 10 generally designates a patient handling apparatus. The term "patient handling apparatus" is used broadly to mean an apparatus that can support a patient, such as a medical bed, including an apparatus that can transport a patient, such as an emergency cot, a stretcher, a stair chair, a wheelchair, or other apparatuses that support and/or transport a patient. Further, the term "patient" is used broadly to include persons that are under medical treatment or an invalid, or persons who just need assistance. Although the patient handling apparatus 10 is illustrated herein as an emergency cot, the term "patient handling apparatus" should not be so limited.

As will be more fully described below, patient handling apparatus 10 is configured with a sensor 34 that is configured to detect loads on the patient handling apparatus, such as the presence of a patient on the support surface, with a high degree of accuracy, but is protected from shock loads, which can be associated with patient handling apparatuses, such as emergency cots. The sensor may also be used to measure the weight of the patient. Therefore, the sensor may be used for a very limited range of measurements (for example, to detect weight up to 200 lbs., or up to 500 lbs.) or detect the weight of the patient, which could be higher (for example around 800 lbs.).

Referring again to FIG. 1, in the illustrated embodiment, patient handling apparatus 10 is configured as an emergency cot and includes a frame 12, which supports a patient support surface in the form of a litter deck 14, and a wheeled base 18. Litter deck options includes a plurality of deck sections 14a, 14b, 14c, 14d, and 14e, with at least deck sections 14a and 14c pivotally mounted to frame 12 at pivot connections 15a and 15b.

As will be more fully described below, patient handling apparatus 10 includes a lift assembly 20 that raises or lowers the base 18 or the deck frame 12 with respect to the other so that the patient handling apparatus 10 can be rearranged between a more compact configuration, for example, for loading into an emergency vehicle, such as an ambulance, and a configuration for use in transporting a patient across a ground surface. Further, as will be more fully described below, lift assembly 20 includes a reconfigurable frame 22 (such as folding frame, including an X-frame), a cylinder 30 that is mounted between base 18 and frame 22 to expand and contract the reconfigurable frame 22 between an extended configuration and a compact configuration to thereby raise or lower the deck frame 12, and a sensor 50, which detects the weight applied on the litter deck to detect when a patient is supported on the litter deck 14. As noted above, sensor 50 may be used to only detect a limited range of weight, for example, up to 200 lbs. or may be also used to weight the patient.

Figure 2:
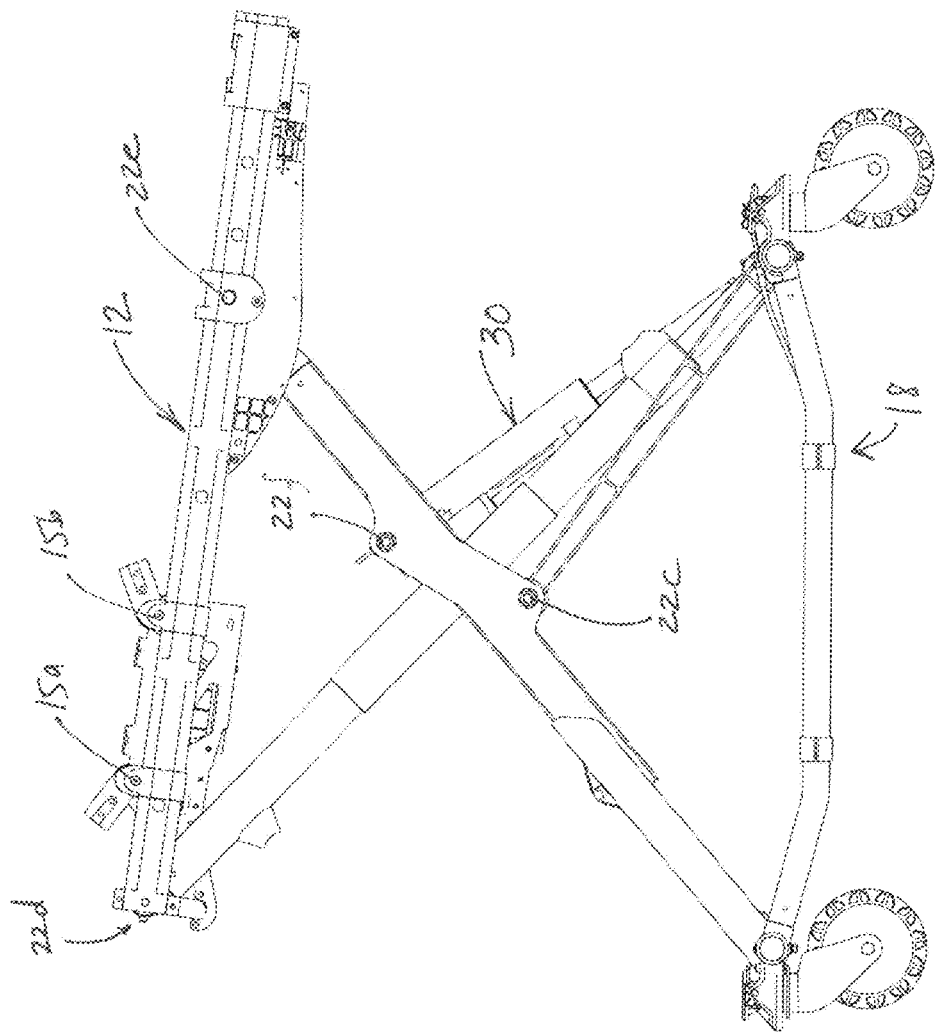
FIG. 2 is a side elevation view of the patient handling apparatus with the patient support surface removed.
Figure 4:
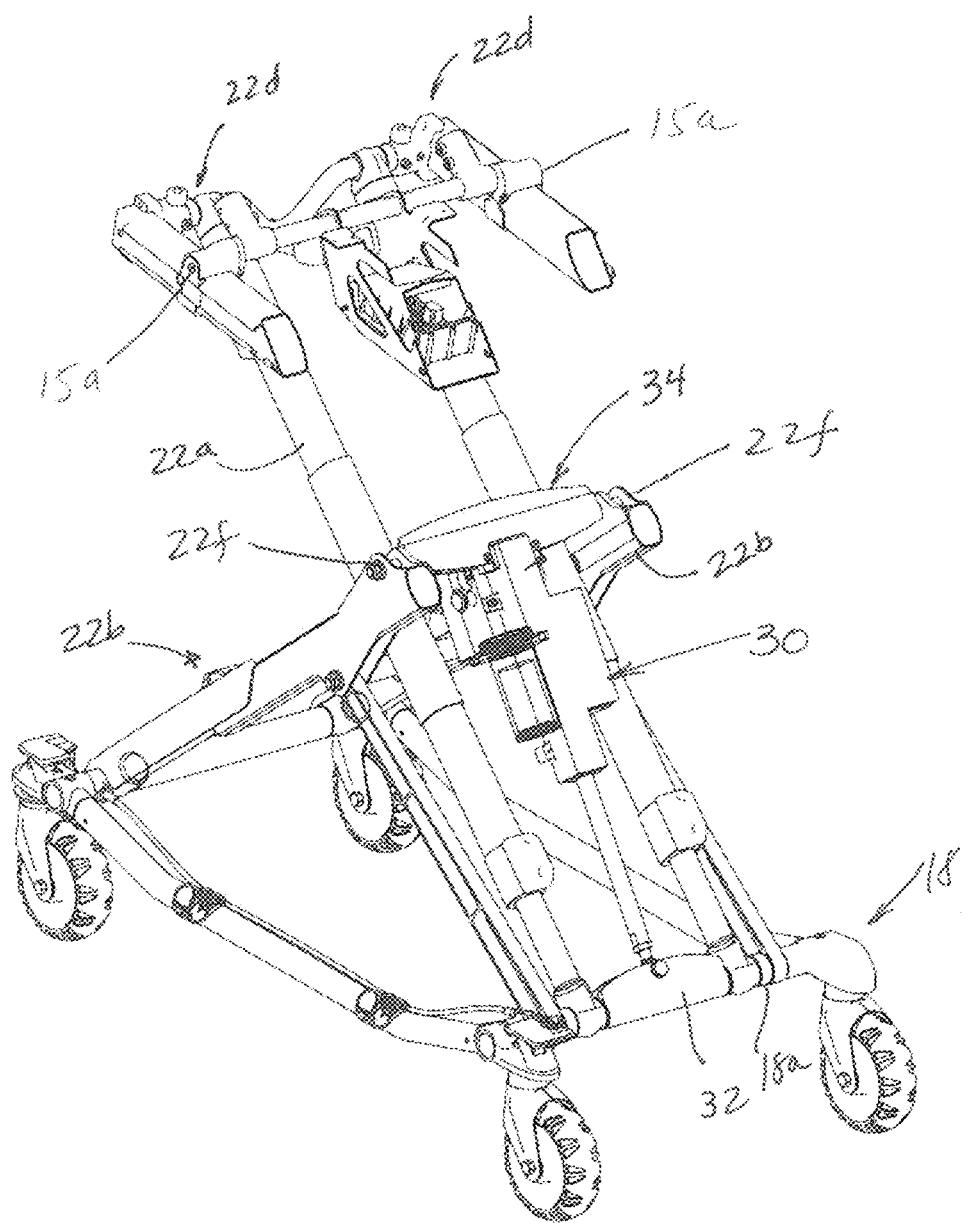
FIG. 4 is another fragmentary perspective view of the patient handling apparatus shown with the patient support surface removed for clarity.

Referring again to FIG. 1, as noted, lift assembly 20 includes a reconfigurable frame 22. In the illustrated embodiment, reconfigurable frame 22 includes two pairs of legs 22a, 22b that are pivotally mounted together about pivot axis 22c. Each of the legs 22a, 22b is pivotally coupled to the deck frame 12 by a head-end upper pivot connection 22d (FIGS. 2 and 4) and a foot-end upper pivot connection 22e (FIGS. 2 and 3). Further, head-end upper pivot connections 22d are fixed to the deck frame 12 along the longitudinal axis of deck frame 12 and foot-end upper pivot connections 22e are movable to avoid binding of the frame when lifting or lowering litter deck 14. For an example of a suitable sliding pivot connection for legs 22b, reference is made to copending patent application entitled PATIENT HANDLING APPARATUS WITH HYDRAULIC CONTROL SYSTEM, Ser. No. 15/949,648, filed Apr. 10, 2018, which is incorporated by reference in its entirety herein.

In the illustrated embodiment, each leg 22a, 22b comprises a telescoping compression/tension member to allow a greater range of movement and tilting of litter deck 14. For further details of a suitable construction of reconfigurable frame 22 and base 18, reference is made to copending patent application entitled PATIENT HANDLING APPARATUS WITH HYDRAULIC CONTROL SYSTEM, Ser. No. 15/949,648, filed Apr. 10, 2018. However, it should be understood that load bearing members or legs 22a, 22b may comprise fixed length members, for example, such of the type shown in U.S. Pat. No. 6,701,545, which is commonly owned by Stryker Corp. of Kalamazoo, MI and incorporated herein by reference in its entirety.

As noted above, to extend and contract reconfigurable frame 22, apparatus 10 includes cylinder 30, which is mounted at its rod end 30a to base 18 by a bracket 32 rotationally mounted on a transverse member 18a of base 18 and mounted at its cylinder housing end 30b to a bracket 34, which is rotatable mounted about pivot connections 22f (FIGS. 1, 2, and 3) between legs 22b of frame 22. It should be understood that depending on the type of frame or legs that support deck frame 12, the bracket need not be rotationally mounted between legs 22b. For example, where legs 22b are configured to extend and contract but not fold, a fixed bracket may be used.

In the illustrated embodiment, actuator 30 comprises a hydraulic cylinder that is controlled by a hydraulic control system. For further details of an optional cylinder and hydraulic control system, reference is again made to copending patent application entitled PATIENT HANDLING APPARATUS WITH HYDRAULIC CONTROL SYSTEM, Ser. No. 15/949,648, filed Apr. 10, 2018. Although one cylinder (actuator) is illustrated, it should be understood that more than one cylinder (actuator) may be used.

For further details of deck frame 12, telescoping legs 22a, 22b, base 18, and other structures not specifically mentioned or described herein, reference is also made to U.S. Pat. Nos.

5,537,700 and 7,398,571, and published Application No. WO 2007/123571, commonly owned by Stryker Corporation, which are herein incorporated by reference in their entireties.

For further optional details on how lift assembly 20 may be mounted to frame 12, reference is made to copending provisional application entitled EMERGENCY COT WITH A LITTER HEIGHT ADJUSTMENT MECHANISM filed on Apr. 10, 2018, which is incorporated herein by reference in its entirety.

Cylinder 30 is extended or retracted by the control system to extend or contract lift assembly 20 and generally operates in four modes. For example, one of the modes may be to raise the deck frame 12 when base 18 is supported on, for example, a ground surface (FIG. 1). A second mode may be to lower the deck frame 12 when base 18 is supported on, for example, a ground surface. A third mode may be to lower or extend base 18 when apparatus 10 is its compact configuration and when the deck frame 12 is supported, for example, by an attendant or a loading and unloading apparatus. A fourth mode may be to raise base 18 when apparatus 10 is its extended configuration and when the deck frame 12 is supported, for example, by an attendant or a loading and unloading apparatus. Further, the hydraulic control system may be used to adjust the flow of hydraulic fluid to and from the cylinder based on an input signal or signals from or the status of sensor 50, described more fully below.

In one or more of these modes, it may be beneficial to know (1) when a patient is supported on the patient support surface, in this case, litter deck 14, (2) when the base is supported on a ground surface, and (3) the approximate weight of the patient. For example, as described in the referenced co-pending application, when lowering or extending base 18 relative to deck frame 12 (when deck frame 12 is supported) the hydraulic control system may be configured to automatically lower or extend base 18 at a faster speed when a patient is not supported on litter deck 14. Also, as described in the referenced co-pending application, the control system may be configured to detect when base 18 is contacting or nearly contacting a ground surface or an obstruction, to stop flow of fluid from the hydraulic control system pump.

Figure 5:
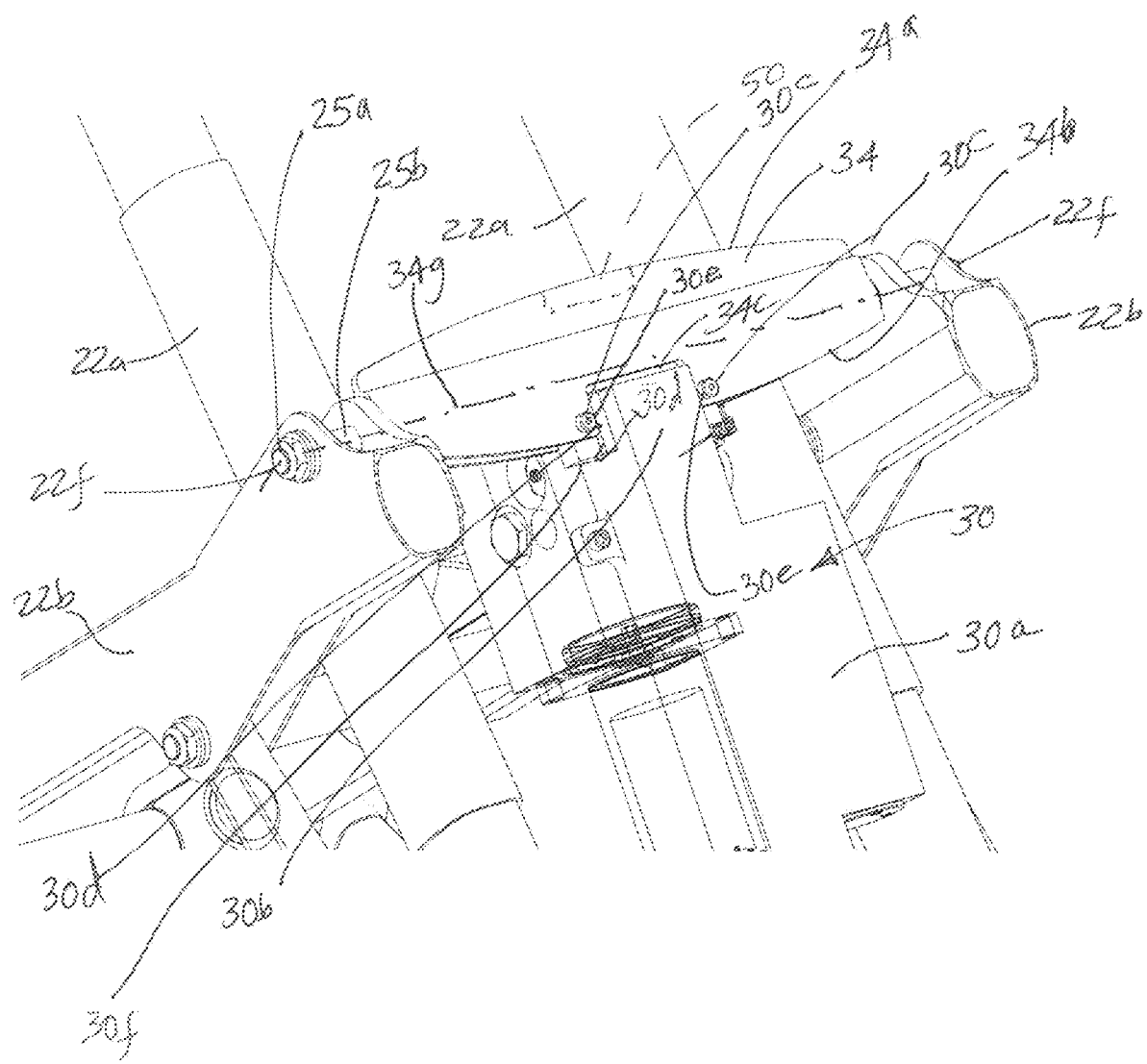
FIG. 5 is an enlarged perspective view of the mounting bracket of the lifting and lowering cylinder of the patient handling apparatus shown with the patient support surface removed for clarity
Figure 6:
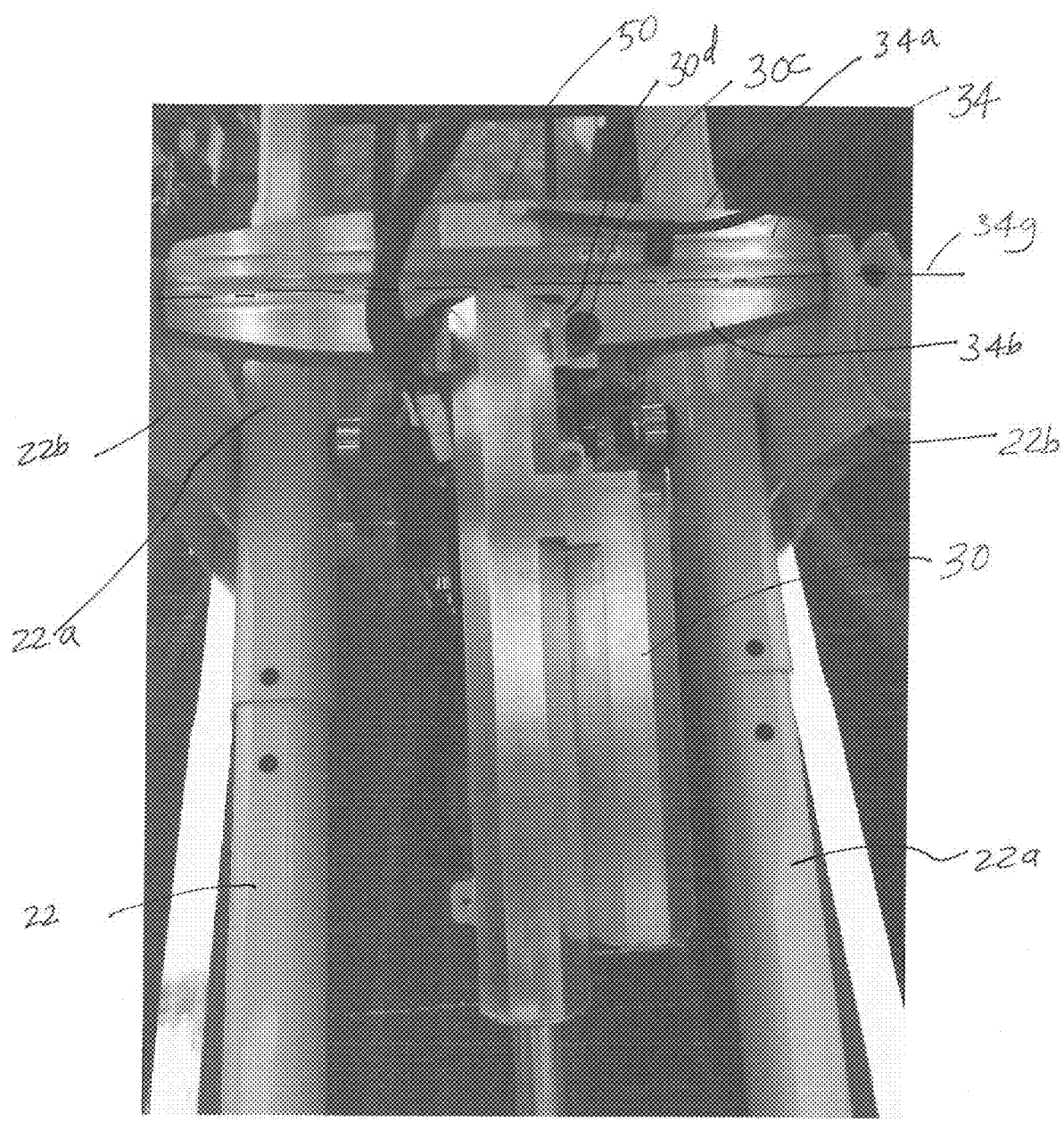
FIG. 6 is a similar view to FIG. 5 illustrating the bracket configured as one embodiment of a strain gauge assembly.
Figure 8:
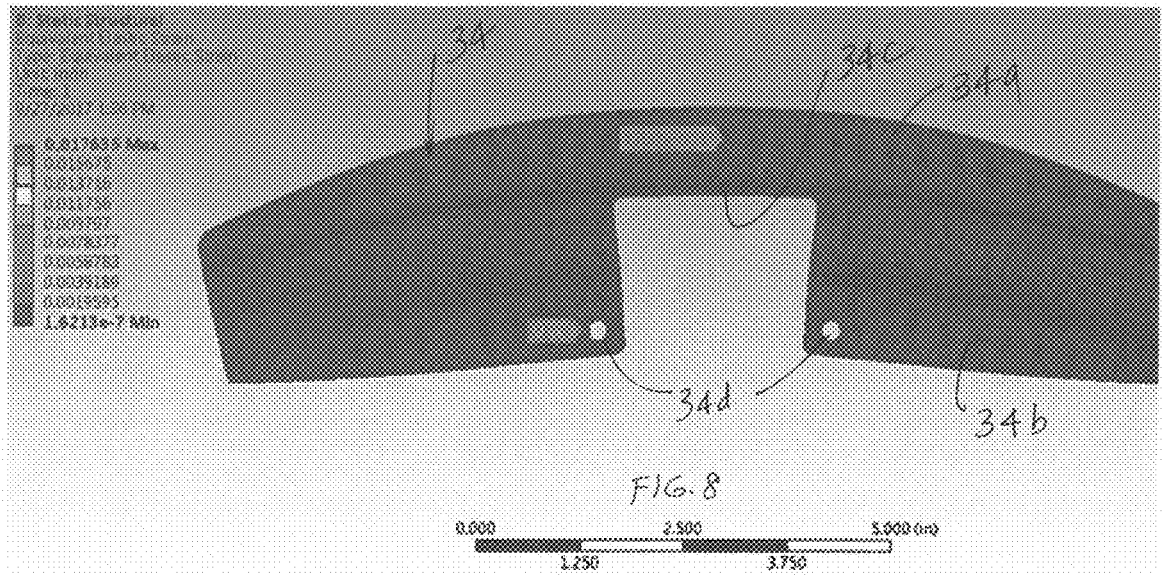
FIG. 8 is an enhanced schematic drawing of the bracket illustrating the bracket bending along its central longitudinal axis wherein the top side of the bracket is in tension.
Figure 9:
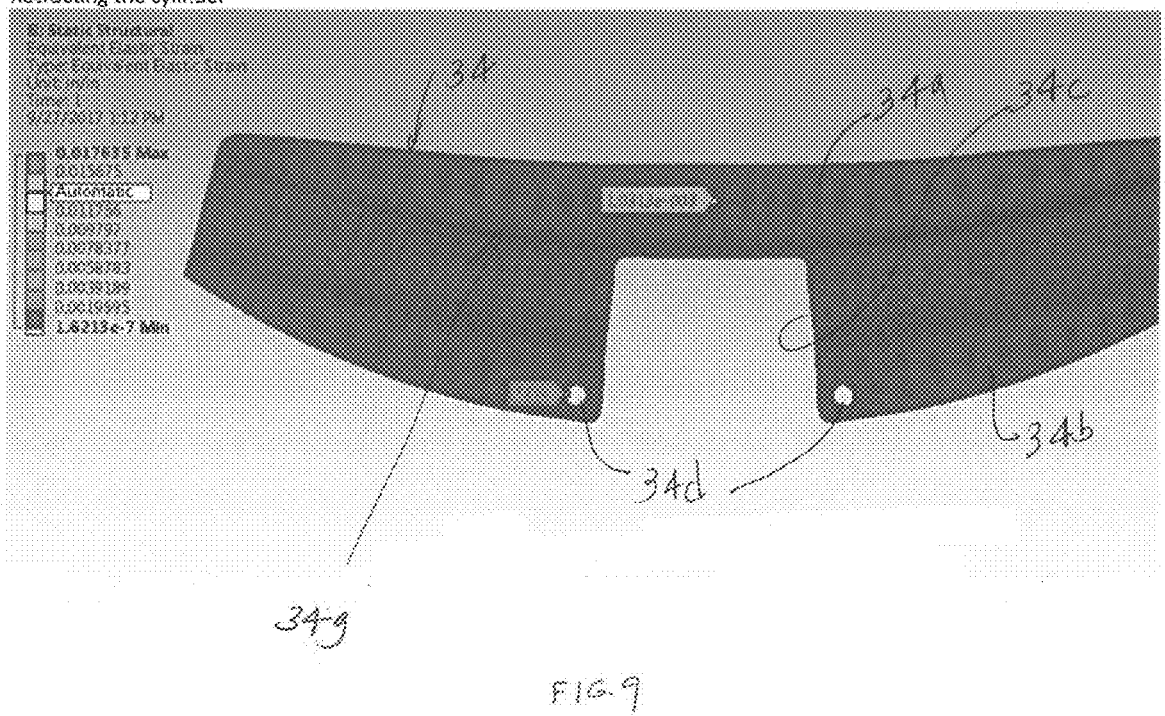
FIG. 9 is an enhanced schematic drawing of the bracket illustrating the bracket bending along its central longitudinal axis wherein the top side of the bracket is in compression.

In order to know these various conditions or information, apparatus 10 includes sensor 50, for example, in the form of a strain gauge. As best seen in FIG. 5, sensor 50 is mounted in mounting bracket 34 so that together bracket 34 and sensor 50 form a strain gauge assembly. Bracket 34 includes an upper side 34a and a lower side 34b, with cylinder 30 mounted to lower side 34b of bracket by a pair of mounting fasteners 30c that extend through mounting openings 34d formed in bracket 34 (see FIGS. 8 and 9). And, sensor 50, which as noted, comprises a strain gauge, such as an electrical strain gauge, is mounted, for example, by an adhesive to bracket 34. In the illustrated embodiment, sensor 50 is mounted at the upper side 34a, which detects the deformation in the bracket due to loading on legs 22a and 22b, and loading from cylinder 30. To detect the maximum deformation in bracket 34 for a given load, sensor 50 is mounted centrally located between the opposed ends of bracket 34.

As described above, bracket 34 is pivotally mounted between legs 22b by pivot connections 22f so that bracket 34 pivots about connections 22f when legs 22a and 22b are folded, for example. In the illustrated embodiment, connections 22f are formed by a threaded rod (or pin) or bolts 25a that extend through bracket 34 and extend from the opposed ends of bracket 34 and into spaced apart flanges (best seen in FIG. 5) formed on legs 22 (and through hollow cylindrical spacers 25b located between the flanges) to define pivot axis 34g (FIG. 5).

Figure 7:
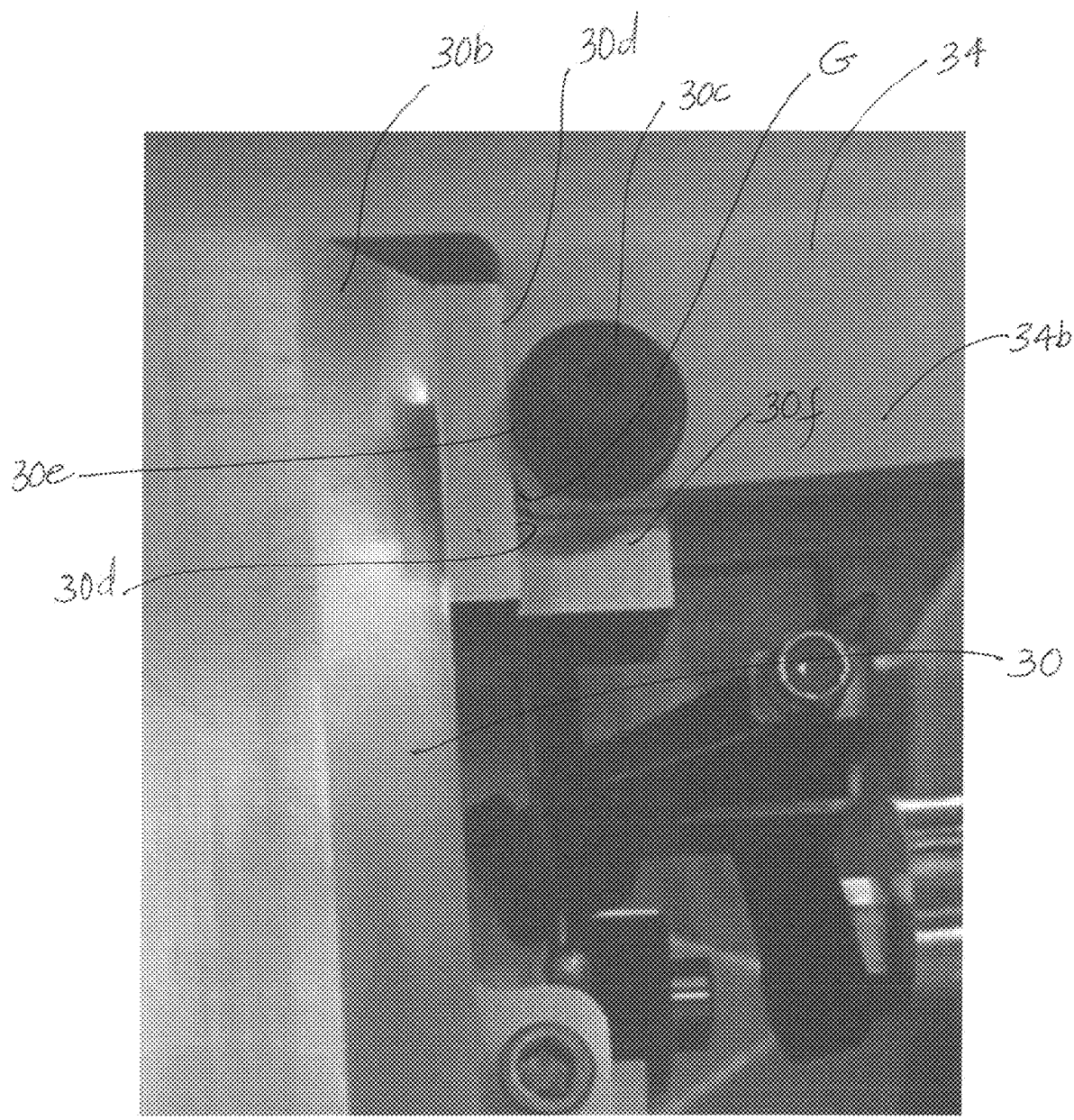
FIG. 7 is an enlarged view of detail VII of FIG. 6.

In the illustrated embodiment, lower side 34b of bracket 34 includes a recess 34c, which is centrally located between opposed ends of bracket 34. Located in recess 34c is the cylinder housing end 30b of cylinder 30, which provides a pair of contact surfaces 30d, as described below. In the illustrated embodiment, each mounting fastener 30c forms a bearing surface 30e that is spaced from a respective contact surface 30d by a distance, which forms a gap G (FIG. 7). Further, mounting fasteners 30c are mounted in slotted openings (not shown) formed in mounting flanges 30f (formed or mounted to opposed sides of cylinder housing end 30b) so that mounting fasteners 30c can move toward or away from contact surfaces 30d when bracket 34 is loaded, as described below. For example, mounting flange 30f and contact surface 30d may be both provided by L-shaped brackets mounted to the opposed side's cylinder housing end 30b.

In this manner, when cylinder 30 is extended to extend the legs 22a, 22d to raise the litter deck 14, cylinder 30 applies a load on bracket 34, subjecting bracket 34 to a bending moment about a bending axis orthogonal to the central longitudinal axis of bracket 34, which may or may not coincide with pivot axis 34g, depending on the cross-section of the member. The term "central longitudinal axis" refers to the longitudinal axis that extends though the geometric center of the bracket, which in the illustrated embodiment is either colinear with or spaced and parallel from the pivot axis. Depending on the cross-section of the bracket, the central longitudinal axis may also be collinear or parallel and spaced from with the neutral axis of the bracket (the axis where there is zero tension or compression when the bracket is subject to bending along its central longitudinal axis).

In this loading scenario, sensor 50 will detect deformation due to tension on side 34a of bracket 34. Opposed or lower side 34b of bracket 34 will be subject to compression, causing recess 34c on lower side 34b to deform and, further, causing mounting fasteners 30c to move toward contact surfaces 30d. Optionally, bracket 34 may be configured to cause the bearing surfaces (formed by fasteners 30c, e.g. fastener head or washer) to contact and bear upon contact surfaces 30d once the load on bracket 34 exceeds a threshold weight that is a sufficient weight to indicate that patient is on the patient support apparatus. For example, the threshold weight for an adult may be less than 200 lbs. For an infant, the threshold weight would be much lower, as would understood.

Alternately, bracket 34 may be configured to cause the bearing surfaces (formed by fasteners 30c) to contact and bear upon contact surfaces 30d once the load on bracket 34 exceeds normal operating loads—that is loads normally associated with transporting a patient, which may be 500 lbs. or less. During normal operation, for example during the raising or lowering of the litter, bearing surfaces 30e of mounting fastener 30c, therefore, do not move sufficiently to contact contact surfaces 30d. However, when subject to a load that exceeds the normal operating loads, bearing surfaces 30e of mounting fasteners 30c will move sufficiently to contact and bear on contact surfaces 30d, and thus creating a stop and significantly reducing, if not preventing, the bracket 34 from further deformation, thus protecting sensor 50 from overload. Thus by reducing or eliminating further deformation, the interaction between the contact surface (s) and bearing surface (s) acts as a shunt for the sensor (strain gauge). While sensor 50 may continue to generate readings, for the purposes of the control of the patient support apparatus, these readings may be ignored.

It should be understood that the contact surfaces may be parallel to or angled relative to the bearing surfaces, including orthogonal. Further, depending on the configuration or construction of the mounting fasteners the bearing surface may be a line (e.g. a line that extends through tangent points on the fastener). Similarly, although shown as being orthogonal to the beading axis, the contact and/or bearing surfaces may be angled relative to the central longitudinal axis or parallel to the central longitudinal axis, such as described below.

In the illustrated embodiment, bracket 34 may be formed from a member with an extruded section with hollow portions, such as described below in reference to bracket 134 (with the threaded rod or bolts extending into a circular transverse portion of the extrusion), or may have a solid cross-section. Further, the member forming bracket 34 may be made from a number of different materials, including a plastic or metal, such as aluminum or steel (such as stainless steel), and therefore, may be formed from molding, stamping, casting, or extrusion, as noted above. Additionally, bracket 34 may be formed from a composite member—that is formed from multiple components or elements. For example, bracket 34 may be formed from several plates that are joined together (e.g. in a stacked arrangement either perpendicular or parallel to the central longitudinal axis), for example, by welding, fastening, or banding (e.g. like a leaf spring). Further, in this configuration, one of the plates may provide the "shunt" or stop. Alternately, a plate may be added to the bracket to provide the shunt or stop.

Referring to FIGS. 10-13, the numeral 134 designates another embodiment of a mounting bracket. Bracket 134 is similar to bracket 34 and is formed from a member with an upper side 134*a* and a lower side 134*b*, with cylinder 30 configured to mounted to lower side 134*b* of bracket by mounting fasteners 30*c* that extend through mounting openings 134*d* formed in bracket 134.

In the illustrated embodiment, sensor 50 is mounted, for example, by an adhesive, to bracket 134 in recess 134*c*, which extends into bracket 134 from lower side 134*b* to detect the deformation in the bracket 134 due to loading on legs 22*a* and 22*b*, and loading from cylinder 30. To detect the maximum deformation, sensor 50 is again mounted centrally located between the opposed ends of bracket 134, but as noted now located on in recess 134*c*.

As noted, the cross-section of bracket 134 may vary. For example, in the illustrated embodiment, bracket 134 is formed from an extrusion with a solid upper side 134*a*, for example, from a plate 135, and a hollow lower section 137 with a plurality of transverse passageways 137*a*, 137*b*, and 137*c* that extend from one side of bracket 134 to the other side of the bracket. Passageway 137*c* has a circular cross-section for receiving the threaded rod or bolts for forming pivot connections 22*f*, described above. Again, depending on the cross-section, the the central longitudinal axis 134*g* may be offset from the pivot axis 34*g* (formed by the threaded rod or bolts) and extend through the center of passageway 137*a*, for example.

In addition, in the illustrated embodiment, bracket 134 includes a horizontal slot 138, which extends along bracket 134 parallel to and spaced from axis 134*g* (which extends through passageway 137*a* and parallel to pivot connections 22*f*). In this manner, when bracket 134 is subject to a load, for example, when cylinder 30 extends to raise the litter, the two opposing surfaces 138*a* and 138*b* of slot 138, which form a gap G1 (FIG. 13) there between and, further, form bearing surfaces and contact surfaces (opposing surfaces 138*a* and 138*b* that define slot 138), will move toward each other to reduce gap G1. However, when subject to a load that exceeds the desired threshold or normal operating loads, the bearing surfaces and contact surfaces 138*a*, 138*b* will move sufficiently to contact and bear on each, and thus create a stop and reduce, if not prevent, the bracket 134 from further deformation, thus protecting sensor 50 from overload.

The length and size of the slot may be varied to increase the flexibility of bracket 134 and, further, the sensitivity of sensors 50. Further, because the slot may extend across at least 50%, 60%, 70% or 80% of the length of the bracket, the slot may cause the bracket to have two bending axes, one above the slot and another below the slot. Again the longer the slot the more flexibility is imparted to bracket 134, which can be used to adjust the sensitivity of the sensor as noted above.

Referring to FIGS. 14-17, the numeral 234 designates another embodiment of a mounting bracket. Bracket 234 is similar to bracket 134 and includes an upper side 234*a* and a lower side 234*b*, with cylinder 30 configured to mount to lower side 234*b* of bracket by mounting fasteners 30*c* that extend through mounting openings 234*d* formed in the lower side 234*b* of bracket 234.

In the illustrated embodiment, bracket 234 may include one or two sensors 50—with one sensor 50*a* mounted to bracket 234 at upper side 234*a*, similar to bracket 34, and/or the second sensor 50*b* mounted in recess 234*c*, which extends into bracket 234 from lower side 234*b* to detect the deformation in the bracket 234 due to loading on legs 22*a* and 22*b*, and loading from cylinder 30. To detect the maximum deformation, each sensor 50*a*, 50*b* is again mounted centrally located between the opposed ends of bracket 234. Though the location of the sensors can be varied in any of these embodiments.

As noted, the cross-section of bracket 234 may vary. For example, in the illustrated embodiment, bracket 234 is also formed from an extrusion with a solid upper side 234*a*, for example, from a plate 235, and a hollow section 237 with a plurality of transverse passageways 237*a*, 237*b*, and 237*c* that extend from one side of the bracket to the other side of the bracket. Passageway 237*b* has a circular cross-section for receiving the threaded rod or bolts for forming pivot connections 22*f*, described above. In the illustrated embodiment, passageway 237*c* comprise a channel with an open side facing downward (as viewed in FIG. 15). In this embodiment, the central longitudinal axis 234*g* of bracket 234 may extend through the center of passageway 237*a*, which is above the top of recess 237*c*, and above the pivot axis (34*g*). In this manner, if both sensors are use, when one sensor 50*a* or 50*b* senses tension, the other sensor 50*a* or 50*b* will sense compression in bracket 234.

In the illustrated embodiment, bracket 234 includes two vertical slots 238, which extend upwardly from lower edge 234h of bracket 234 and above central longitudinal axis 234*g*. Vertical slots 238 may be parallel to and spaced from each other but angled, such as perpendicular, to central longitudinal axis 234*g*. In this manner, when bracket 234 is subject to a load, for example, when cylinder 30 extends to raise the litter, the two opposing surfaces 238*a* and 238*b* of each slot 238, which form a gap G2 there between and further form bearing surfaces and contact surfaces that define each slot 238, will move toward each other to reduce gap G2. However, when subject to a load that exceeds the normal operating loads, the bearing surfaces and contact surfaces 238*a*, 238*b* will move sufficiently to contact and bear on each, and thus create a hard stop and prevent the bracket 134 from further deformation, thus protecting sensor 50 from overload.

The location, number, and/or size of slots 238 may be varied to vary the flexibility of bracket, which can be used to increase the sensitivity of sensor 50.

The terms "head-end" and "foot-end" used herein are location reference terms and are used broadly to refer to the location of the cot that is closer to the portion of the cot that supports a head of a person and the portion of the cot that supports the feet of a person, respectively, and should not be construed to mean the very ends or distal ends of the cot.

While several forms of the invention have been shown and described, other forms will now be apparent to those skilled in the art. For example, one or more of the features of the strain gauge assembly and/or apparatus 10 may be incorporated into other patient support apparatuses. Similarly, other features form other cots may be incorporated into patient support apparatus 10. Examples of other cots that may incorporate one or more of the features described herein or which have features that may be incorporated herein are described in U.S. Pat. Nos. 7,100,224; 5,537,700; 6,701,545; 6,526,611; 6,389,623; and 4,767,148, and U.S. Publication Nos. 2005/0241063 and 2006/0075558, which are all incorporated by reference herein in their entireties.

Further, any one of the various features described in one embodiment may be used in another embodiment. Therefore, it will be understood that the embodiments shown in the drawings and described above are merely for illustrative purposes, and are not intended to limit the scope of the invention, which is defined by the claims, which follow as interpreted under the principles of patent law including the doctrine of equivalents.

We claim:

1. A strain gauge assembly comprising:
   a member;
   a strain gauge supported by said member;
   a bearing surface; and
   a contact surface spaced from said bearing surface, and when said member is subject to a predetermined bending force said bearing surface contacting said contact surface wherein at least a portion of the bending force bypasses said strain gauge and instead is transferred from said bearing surface to said contact surface.

2. The strain gauge assembly according to claim 1, wherein said member has an axis, a first side, and a second side, said first side and said second side each being spaced from said axis, and said strain gauge is supported by said member at said first side.

3. The strain gauge assembly according to claim 2, wherein said second side includes at least one recess.

4. The strain gauge assembly according to claim 3, wherein said bearing surface is mounted adjacent said at least one recess.

5. The strain gauge assembly according to claim 4, wherein said contact surface is mounted adjacent said at least one recess.

6. The strain gauge assembly according to claim 1, wherein said bearing surface comprises a first bearing surface and said contact surface comprises a first contact surface, further comprising a second bearing surface and a second contact surface.

7. The strain gauge assembly according to claim 1, wherein said member comprises a bracket.

8. The strain gauge assembly according to claim 1, wherein said member includes at least one slot extending into said second side, said at least one slot having two opposed sides, one of said sides of said at least one slot forming said bearing surface, and another of said sides of said at least one slot forming said contact surface.

9. The strain gauge assembly according to claim 1, wherein said member includes an axis and a plurality of slots to control the location of bending when a bending force is applied along said axis.

10. The strain gauge assembly according to claim 1, wherein said member has an axis and said contact surface is orthogonal to said axis.

11. A patient support apparatus comprising:
    a patient support surface;
    a lift assembly supporting said patient support surface; and
    a strain gauge assembly mounted in said lift assembly to measure the strain in said lift assembly, said strain gauge assembly having a member:
    a strain gauge supported by said member;
    a bearing surface; and
    a contact surface adjacent and being spaced from said bearing surface, and when said member is subject to a predetermined bending force said bearing surface contacting said contact surface wherein at least a portion of the bending force bypasses said strain gauge and instead is transferred from said bearing surface to said contact surface.

12. The patient support apparatus according to claim 11, wherein said member has an axis, a first side, and a second side, said first side and said second side each being spaced from said axis, and said strain gauge is supported by said member at said first side.

13. The patient support apparatus according to claim 12, wherein said second side includes at least one recess, and said bearing surface is mounted adjacent said at least one recess.

14. The patient support apparatus according to claim 13, wherein said contact surface is mounted in said at least one recess.

15. The patient support apparatus according to claim 11, wherein said lift assembly comprises a reconfigurable frame, such as a pair of folding legs, said patient support apparatus further comprising an actuator reconfiguring said lift assembly between a compact configuration and a raised configuration, and said member comprises a bracket, and said bracket forming a mounting surface for said actuator to said lift assembly.

16. The patient support apparatus according to claim 15, wherein said bearing surface comprises a first bearing surface and said contact surface comprises a first contact surface, further comprising a second bearing surface and a second contact surface, and said actuator being mounted to said bracket by a pair of actuator mounts, and said pair of actuator mounts forming said first and second bearing surfaces.

17. The patient support apparatus according to claim 16, wherein said bracket includes a recess with opposed sides, and said pair of actuator mounts located at the opposed sides of said recess, and said first and second contact surfaces being mounted adjacent said recess for engagement by said actuator mounts when said bracket undergoes bending.

18. The patient support apparatus according to claim 11, wherein said member has a central longitudinal axis, and said contact surface is parallel relative to said central longitudinal axis.

19. The patient support apparatus according to claim 11, wherein said member has a central longitudinal axis, and said contact surface is angled relative to said axis.

20. The patient support apparatus according to claim 19, wherein said central longitudinal axis comprises a neutral axis of the member.

\* \* \* \* \*